(12) United States Patent
Yang et al.

(10) Patent No.: US 12,362,416 B2
(45) Date of Patent: Jul. 15, 2025

(54) BATTERY PACK AND VEHICLE COMPRISING SAME

(71) Applicant: LG ENERGY SOLUTION, LTD., Seoul (KR)

(72) Inventors: Jin-Oh Yang, Daejeon (KR);
Kwang-Keun Oh, Daejeon (KR);
In-Hyuk Jung, Daejeon (KR);
Hae-Won Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 264 days.

(21) Appl. No.: 18/014,324

(22) PCT Filed: Mar. 4, 2022

(86) PCT No.: PCT/KR2022/003122
§ 371 (c)(1),
(2) Date: Jan. 3, 2023

(87) PCT Pub. No.: WO2022/186663
PCT Pub. Date: Sep. 9, 2022

(65) Prior Publication Data
US 2023/0246275 A1 Aug. 3, 2023

(30) Foreign Application Priority Data
Mar. 4, 2021 (KR) .................... 10-2021-0029091

(51) Int. Cl.
*H01M 50/204* (2021.01)
*H01M 10/613* (2014.01)
*H01M 50/507* (2021.01)

(52) U.S. Cl.
CPC ....... *H01M 50/204* (2021.01); *H01M 10/613* (2015.04); *H01M 50/507* (2021.01)

(58) Field of Classification Search
CPC .......................... H01M 50/204; H01M 50/507
See application file for complete search history.

(56) References Cited

U.S. PATENT DOCUMENTS

| 2009/0214940 A1 | 8/2009 | Haussmann |
| 2010/0009248 A1 | 1/2010 | Fuhrmann et al. |
| 2011/0287287 A1 | 11/2011 | Kang |

(Continued)

FOREIGN PATENT DOCUMENTS

| CN | 105977578 B | 1/2019 |
| CN | 209747684 U | 12/2019 |

(Continued)

OTHER PUBLICATIONS

Extended European Search Report for European Application No. 22763644.6, dated Jun. 26, 2024.

(Continued)

*Primary Examiner* — Jonathan G Jelsma
(74) *Attorney, Agent, or Firm* — Birch, Stewart, Kolasch & Birch, LLP

(57) ABSTRACT

Discussed is a battery pack that can include a battery cell assembly including a plurality of battery cells, a busbar assembly on one side of the battery cell assembly, a cooling unit between the plurality of battery cells, and a cell accommodation unit configured to partition the plurality of battery cells together with the cooling unit.

39 Claims, 16 Drawing Sheets

(56) References Cited

U.S. PATENT DOCUMENTS

| | | | |
|---|---|---|---|
| 2013/0004822 A1 | 1/2013 | Hashimoto et al. | |
| 2015/0111082 A1 | 4/2015 | Sumpf et al. | |
| 2019/0148681 A1* | 5/2019 | Park | H01M 50/289 |
| | | | 429/120 |
| 2019/0267584 A1 | 8/2019 | Kwon et al. | |
| 2019/0305395 A1 | 10/2019 | Favaretto et al. | |
| 2020/0227708 A1 | 7/2020 | Ahn et al. | |
| 2021/0050635 A1 | 2/2021 | Lee et al. | |
| 2021/0218087 A1 | 7/2021 | Yoo et al. | |
| 2021/0320343 A1* | 10/2021 | Flannery | H01M 50/213 |

FOREIGN PATENT DOCUMENTS

| | | | | |
|---|---|---|---|---|
| JP | 2009-193961 A | 8/2009 | | |
| JP | 2010-114063 A | 5/2010 | | |
| JP | 2016-537799 A | 12/2016 | | |
| KR | 10-1016596 B1 | 2/2011 | | |
| KR | 10-2017-0142446 A | 12/2017 | | |
| KR | 10-2019-0054897 A | 5/2019 | | |
| KR | 10-2019-0086853 A | 7/2019 | | |
| KR | 10-2019-0093991 A | 8/2019 | | |
| KR | 10-2019-0097231 A | 8/2019 | | |
| KR | 10-2020-0036640 A | 4/2020 | | |
| KR | 10-2021-0016826 A | 2/2021 | | |
| WO | WO-2008104356 A1 * | 9/2008 | | H01M 10/613 |
| WO | WO 2020/256303 A1 | 12/2020 | | |

OTHER PUBLICATIONS

Japanese Office Action dated Jan. 22, 2024 for Application No. 2022-577375.
Notice of Allowance dated Aug. 5, 2024 for Japanese Application No. 2022-577375.
International Search Report for PCT/KR2022/003122 (PCT/ISA/210) mailed on Jun. 17, 2022.

* cited by examiner

BATTERY PACK AND VEHICLE COMPRISING SAME

TECHNICAL FIELD

The present disclosure relates to a battery pack and a vehicle comprising the same.

The present application claims the benefit of Korean Patent Application No. 10-2021-0029091 filed on Mar. 4, 2021 with the Korean Intellectual Property Office, the disclosure of which is incorporated herein by reference in its entirety.

BACKGROUND ART

Due to their characteristics of being easily applicable to various products and electrical properties such as a high energy density, secondary batteries are not only commonly applied to portable devices, but universally applied to electric vehicles (EVs) or hybrid electric vehicle (HEVs) that are driven by an electrical driving source. Such secondary batteries are gaining attention for their primary advantage of remarkably reducing the use of fossil fuels and not generating by-products from the use of energy, making it a new eco-friendly and energy efficient source of energy.

The types of secondary batteries widely used at present include lithium ion batteries, lithium polymer batteries, nickel cadmium batteries, nickel hydrogen batteries, nickel zinc batteries or the like. This unit secondary battery cell, i.e., a unit battery cell has an operating voltage of about 2.5V to 4.5V. Accordingly, when a higher output voltage is required, a plurality of battery cells may be connected in series to fabricate a battery pack. Additionally, the battery pack may be fabricated by connecting the plurality of battery cells in parallel according to the charge/discharge capacity required for the battery pack. Accordingly, the number of battery cells included in the battery pack may be variously set depending on the required output voltage or charge/discharge capacity.

Meanwhile, when fabricating the battery pack by connecting the plurality of battery cells in series/in parallel, it is general to make a battery module including at least one battery cell, and then fabricate a battery pack or a battery rack using at least one battery module with an addition of any other component.

In general, the conventional battery pack includes a plurality of battery cells and a cell frame accommodating the plurality of battery cells. In general, the conventional cell frame includes an assembly of a plurality of plates including a front plate, a rear plate, a side plate, a lower plate and an upper plate to accommodate the plurality of battery cells and ensure the strength.

However, due to the characteristics of the cell frame structure including the assembly of the plurality of plates, the conventional battery pack has the increased fabrication cost and the complex assembly process, and thus there are price competitiveness and fabrication efficiency disadvantages.

Furthermore, due to the cell frame structure including the assembly of the plurality of plates, the conventional battery pack has an increase in its total size and thus there is an energy density disadvantage.

DISCLOSURE

Technical Problem

Accordingly, the present disclosure is directed to providing a battery pack with increased energy density and strength and a vehicle comprising the same.

Additionally, the present disclosure is further directed to providing a battery pack with improved price competitiveness and fabrication efficiency and a vehicle comprising the same.

Furthermore, the present disclosure is further directed to providing a battery pack with improved cooling performance and a vehicle comprising the same.

Technical Solution

To solve the above-described problem, there is provided a battery pack including a battery cell assembly that can include a plurality of battery cells; a busbar assembly on one side of the battery cell assembly; a cooling unit between the plurality of battery cells; and a cell accommodation unit configured to partition the plurality of battery cells together with the cooling unit.

Preferably, the battery pack may include a filling member filled in a space between the cooling unit and the plurality of battery cells.

Preferably, the filling member may be filled in the busbar assembly to cover at least part of the busbar assembly.

Preferably, the filling member may be filled to cover the battery cell assembly and the cell accommodation unit.

Preferably, the filling member may be continuously filled in between the busbar assembly and the plurality of battery cells in a vertical direction of the battery cell assembly.

Preferably, the filling member may include a potting resin.

Preferably, the cell accommodation unit may include at least one accommodation member having a predetermined length along a lengthwise direction of the battery cell assembly to cover at least one surface of a plurality of facing battery cells that face the accommodation member among the plurality of battery cells.

Preferably, the at least one accommodation member may have a shape corresponding to an outer surface of the plurality of facing battery cells.

Preferably, the cell accommodation unit may include a plurality of accommodation members, and the plurality of accommodation members may be spaced a predetermined distance apart from each other along a widthwise direction of the battery cell assembly.

Preferably, each accommodation member may include a plurality of cell accommodation portions accommodating the plurality of facing battery cells, respectively.

Preferably, the plurality of cell accommodation portions may be concavely formed to a predetermined depth.

Preferably, the plurality of cell accommodation portions may have a shape corresponding to an outer surface of the plurality of facing battery cells.

Preferably, an adhesive may be between the plurality of battery cells and the cell accommodation units.

Preferably, the adhesive may include a potting resin.

Preferably, the cooling unit may be between the plurality of accommodation members in the widthwise direction of the battery cell assembly.

Preferably, the cooling unit may include a plurality of cooling tubes having a predetermined length along the lengthwise direction of the battery cell assembly, being arranged between the plurality of battery cells and having a cooling channel configured to circulate cooling water therein; and a cooling water inlet/outlet connected to the plurality of cooling tubes such that the cooling water inlet/outlet is in communication with the cooling channel of the plurality of cooling tubes.

Preferably, the plurality of cooling tubes may be arranged between the plurality of accommodation members.

Preferably, the cooling channel may include an upper channel closer to the busbar assembly; a lower channel spaced apart from the upper channel; and a connection channel connecting the upper channel to the lower channel.

Preferably, the connection channel may be opposite to the cooling water inlet/outlet in the cooling unit.

Preferably, the cooling water inlet/outlet may include a cooling water feed port connected to the upper channel; and a cooling water outlet port connected to the lower channel.

Preferably, the cooling channel may include a plurality of the upper channels and a plurality of the lower channels.

Preferably, the battery pack may include a cell support unit coupled to the cell accommodation unit to support the battery cell assembly and the cooling unit.

Preferably, the cell support unit may further include a support rib protruding to a predetermined height to support the cell accommodation unit.

Preferably, the cell support unit may include a plurality of the support ribs, and the cooling unit may be between the plurality of the support ribs.

Preferably, the support rib may include an insertion groove of a predetermined depth into which a bottom of the cell accommodation unit is inserted.

Preferably, the cell support unit may be perpendicular to the cell accommodation unit.

Preferably, the cell accommodation unit may support sides of the plurality of battery cells, and the cell support unit may support a bottom of the plurality of battery cells.

Preferably, the cell support unit may include a cell mount portion on which the plurality of battery cells are mounted.

Preferably, the cell mount portion may include an opening of a predetermined size.

Preferably, the opening have a size that does not exceed a diameter of each battery cell of the plurality of battery cells.

Preferably, the cell accommodation unit may be arranged in a honeycomb shape.

Preferably, the busbar assembly may be provided to an upper side of the battery cell assembly.

In addition, the present disclosure provides a vehicle including at least one battery pack according to the above-described embodiments.

In addition, the present disclosure provides a battery pack including a battery cell assembly including a plurality of battery cells; a cell accommodation unit and a cell support unit coupled to each other to support the plurality of battery cells; and a filling member filled to cover the battery cell assembly and the cell accommodation unit.

Preferably, the cell support unit may be coupled perpendicularly to the cell accommodation unit.

Preferably, the cell accommodation unit may have a reinforcement structure on two outermost sides thereof to reinforce a strength of the battery cell assembly.

Preferably, the reinforcement structure may be an angled shape structure protruding outward from the cell accommodation unit.

Preferably, the reinforcement structure may be continuous along a lengthwise direction of the battery cell assembly.

Preferably, the reinforcement structure may have a triangle prism shape or a trapezoidal shape.

Preferably, the filling member may be filled to cover the reinforcement structure.

Advantageous Effects

According to the various embodiments as described above, it is possible to provide a battery pack with increased energy density and strength and a vehicle comprising the same.

Additionally, according to the various embodiments as described above, it is possible to provide a battery pack with improved price competitiveness and fabrication efficiency and a vehicle comprising the same.

Furthermore, according to the various embodiments as described above, it is possible to provide a battery pack with improved cooling performance and a vehicle comprising the same.

DESCRIPTION OF DRAWINGS

The accompanying drawings illustrate exemplary embodiments of the present disclosure, and together with the detailed description of the present disclosure described below, serve to provide a further understanding of the technical aspects of the present disclosure, and thus the present disclosure should not be construed as being limited to the drawings.

BEST MODE

The present disclosure will become apparent by describing an exemplary embodiment of the present disclosure in detail with reference to the accompanying drawings. The embodiment described herein is provided by way of illustration to help an understanding of the present disclosure, and it should be understood that various modifications may be made to the present disclosure in other embodiments than the embodiment described herein. Additionally, to help an understanding of the present disclosure, the accompanying drawings are not shown in true scale and may depict some exaggerated elements.

Figure 1:
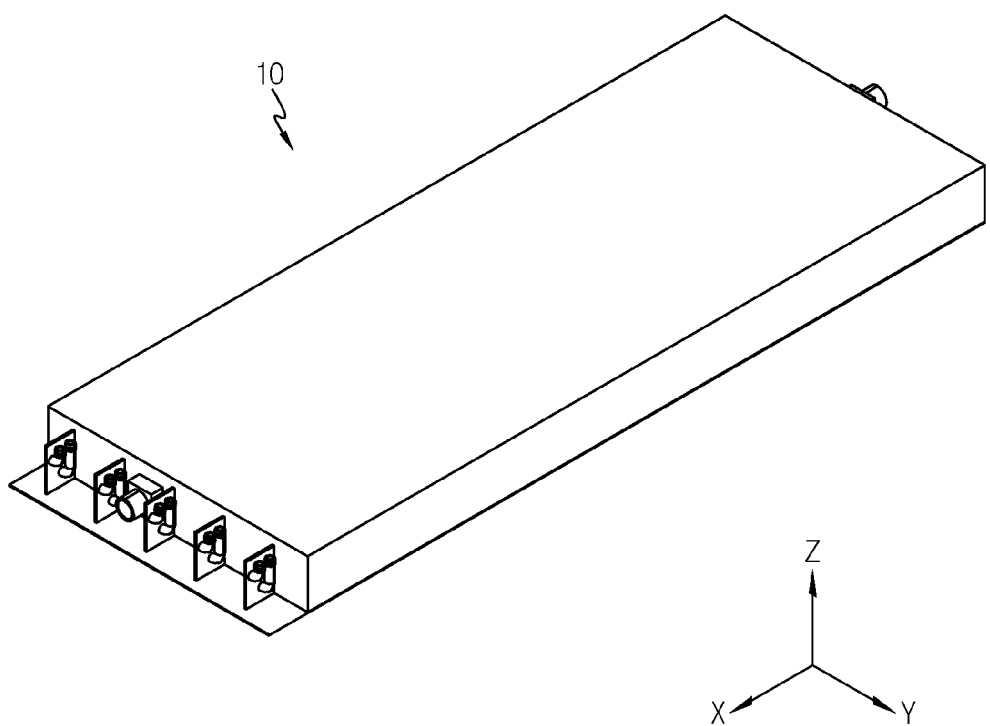
FIG. 1 is a diagram illustrating a battery pack according to an embodiment of the present disclosure.
Figure 2:
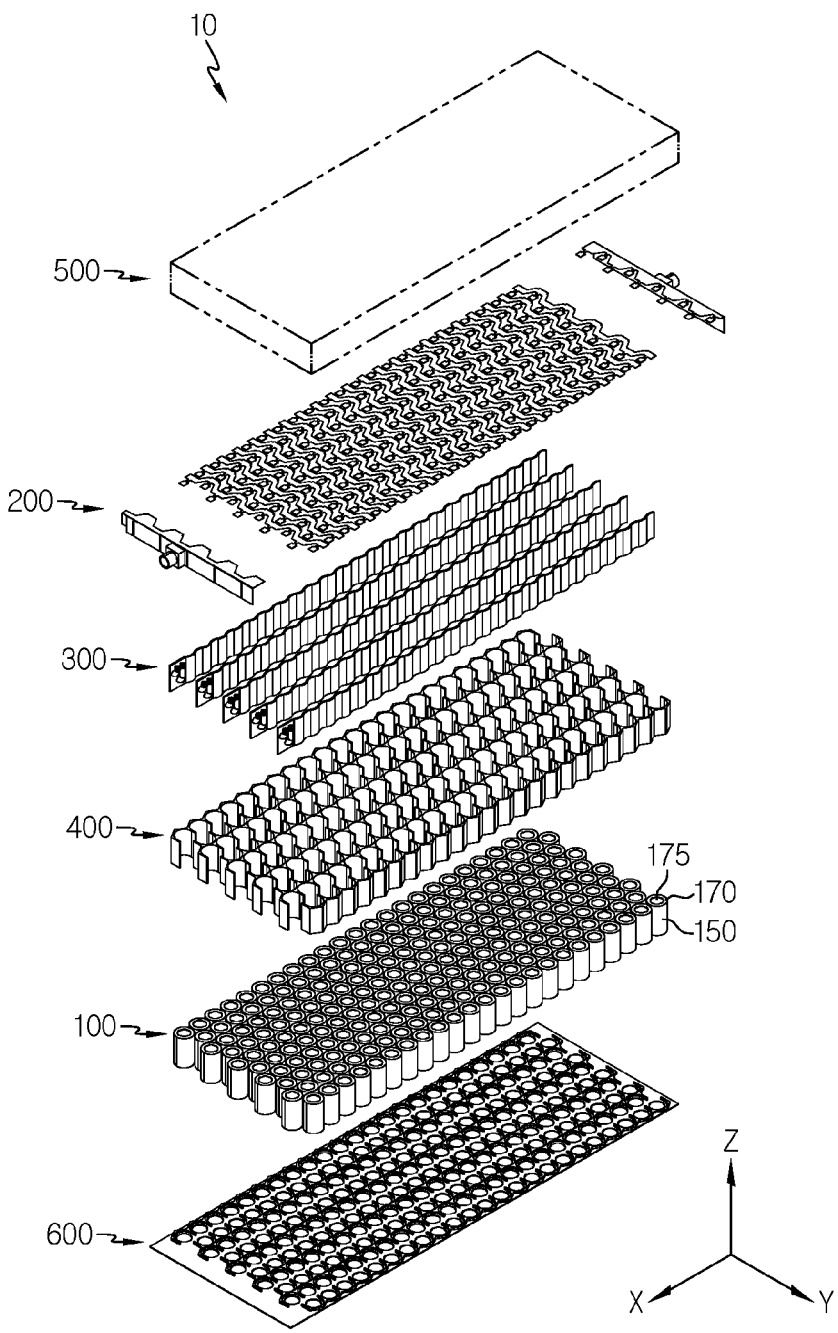
FIG. 2 is an exploded perspective view of the battery pack of FIG. 1.

FIG. 1 is a diagram illustrating a battery pack according to an embodiment of the present disclosure, and FIG. 2 is an exploded perspective view of the battery pack of FIG. 1.

Referring to FIGS. 1 and 2, the battery pack 10 may be provided in an electric vehicle or a hybrid electric vehicle as an energy source. Hereinafter, the battery pack 10 provided in the electric vehicle will be described in more detail in the following relevant drawings.

The battery pack 10 may include a battery cell assembly 100, a busbar assembly 200, a cooling unit 300 and a cell accommodation unit 400.

a plurality of battery cells 150 of the battery cell assembly 100 may include secondary batteries, for example, cylindrical secondary batteries, pouch type secondary batteries or prismatic secondary batteries. Hereinafter, this embodiment will be described based on cylindrical secondary batteries as the plurality of battery cells 150.

Figure 3:
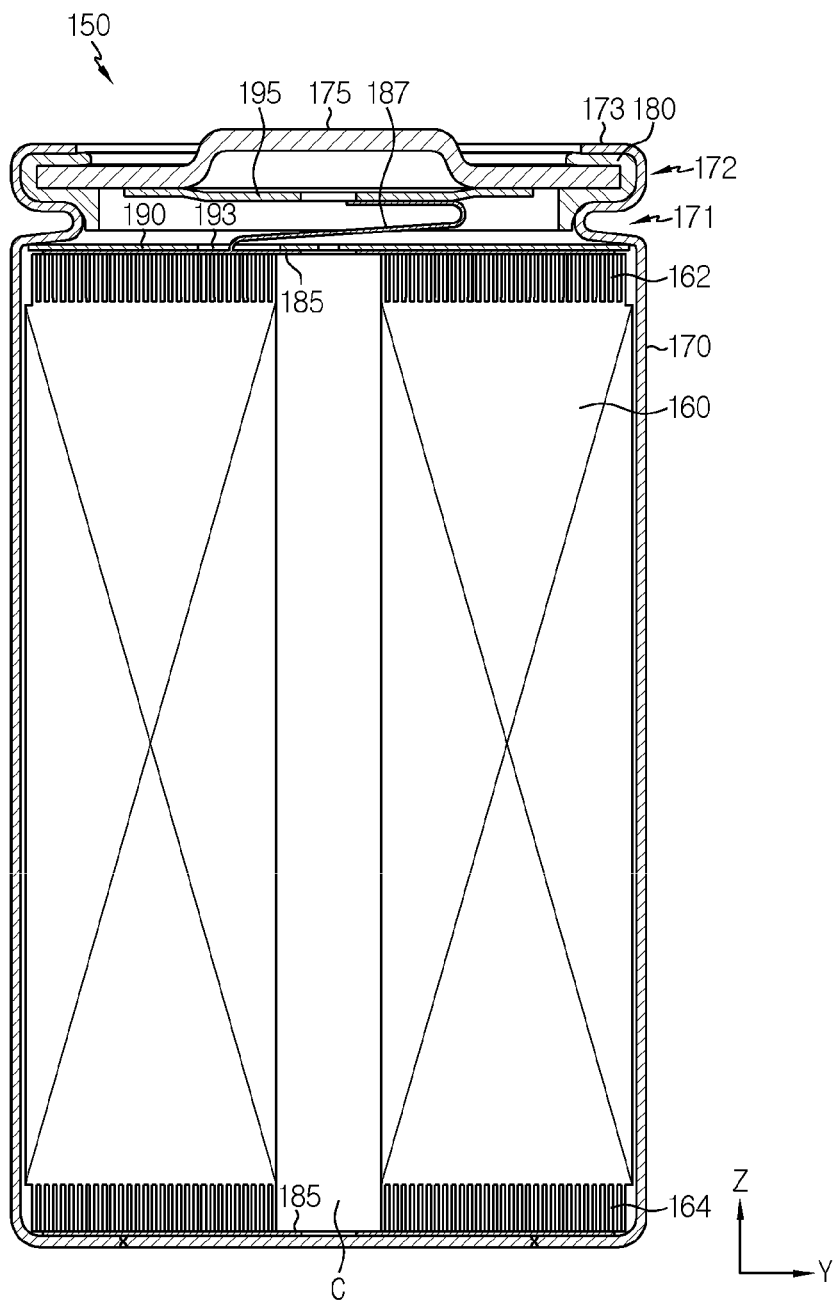
FIG. 3 is a diagram illustrating a battery cell of a battery cell assembly of the battery pack of FIG. 2.

FIG. 3 is a diagram illustrating the battery cell of the battery cell assembly of the battery pack of FIG. 2.

Referring to FIG. 3 together with FIG. 2, the plurality of battery cells 150 may be stacked such that they are electrically connected to each other. The plurality of battery cells 150 may have both a positive electrode 175 and a negative electrode 170 on top. Specifically, the positive electrode 175 of the battery cell 150 may be at the center of the top of the battery cell 150, and the negative electrode 170 of the battery cell 150 may be at the edge of the top of the battery cell 150.

In this embodiment, as described above, since both the positive electrode 175 and the negative electrode 170 of the plurality of battery cells 150 are on one side (+Z axis direction) of the battery cells 150, to be specific, the upper side (+Z axis direction) of the battery cells 150, it may be easier to establish an electrical connection to the busbar assembly 200 as described below.

Accordingly, in this embodiment, due to the structure in which the positive electrode 175 and the negative electrode 170 of the plurality of battery cells 150 are arranged in the same direction (+Z axis direction), it is possible to simplify the structure of connection to the busbar assembly 200 as described below and reduce the volume occupied by the electrical connection structure, compared to a structure in which the positive electrode and the negative electrode are arranged in either direction.

Accordingly, in this embodiment, it is possible to simplify the electrical connection structure between the battery cells 150 and the busbar assembly 200 as described below, thereby achieving the compact structure and improved energy density of the battery pack 10.

Hereinafter, the battery cell 150 will be described in more detail.

The battery cell 150 may include an electrode assembly 160, a battery can 170 and a top cap 175. In addition to the above-described components, the battery cell 150 may further include a sealing gasket 180, a current collector plate 185, an insulation plate 190 and a connection plate 195.

The electrode assembly 160 includes a first electrode plate having a first polarity, a second electrode plate having a second polarity and a separator interposed between the first electrode plate and the second electrode plate. The electrode assembly 160 may have a jelly-roll shape. That is, the electrode assembly 160 may be formed by winding a stack around a winding center C, the stack formed by stacking the first electrode plate, the separator and the second electrode plate at least once in that order. In this case, the separator may be on the outer circumferential surface of the electrode assembly 160 for insulation from the battery can 170. The first electrode plate is a positive or negative electrode plate, and the second electrode plate corresponds to an electrode plate having the opposite polarity to the first electrode plate.

The first electrode plate includes a first electrode current collector and a first electrode active material coated on one or two surfaces of the first electrode current collector. An uncoated region exists, in which the first electrode active material is not coated, at one end of the widthwise direction (parallel to the Z axis) of the first electrode current collector. The uncoated region may act as a first electrode tab 162. The first electrode tab 162 is at the upper part of the heightwise direction (parallel to the Z axis) of the electrode assembly 160 accommodated in the battery can 170.

The second electrode plate includes a second electrode current collector and a second electrode active material coated on one or two surfaces of the second electrode current collector. An uncoated region exists, in which the second electrode active material is not coated, at the other end of the widthwise direction (parallel to the Z axis) of the second electrode current collector. The uncoated region acts as a second electrode tab 164. The second electrode tab 164 is at the lower part of the heightwise direction (parallel to the Z axis) of the electrode assembly 160 accommodated in the battery can 170.

The battery can 170 is a cylindrical container having a top opening, and is made of a metal having conductive properties. The battery can 170 accommodates the electrode assembly 160 together with an electrolyte through the top opening.

The battery can 170 is electrically connected to the second electrode tab 164 of the electrode assembly 160. Accordingly, the battery can 170 has the same polarity as the second electrode tab 164. In this embodiment, the battery can 170 may act as the negative electrode 170.

The battery can 170 includes a beading portion 171 and a crimping portion 172 at the upper end. The beading portion 171 is on the electrode assembly 160. The beading portion 171 is formed by press-fitting the periphery of the outer circumferential surface of the battery can 170. The beading portion 171 may prevent the electrode assembly 160 having a size corresponding to the width of the battery can 170 from slipping out of the top opening of the battery can 170, and may act as a support on which the top cap 175 is seated.

A top edge 173 of the beading portion 171 of the battery can 170 may be inserted into or positioned in contact with a guide groove 249 of a negative electrode connection portion 248 of the busbar assembly 200 as described below. This is to make a welding process easier in the welding process for electrical connection between the busbar assembly 200 as described below and the battery can 170 that acts as the negative electrode 170.

The crimping portion 172 is on the beading portion 171. The crimping portion 172 is extended and bent to cover the outer circumferential surface of the top cap 175 on the beading portion 171 and part of the upper surface of the top cap 175.

The top cap 175 is a component made of a metal having conductive properties, and covers the top opening of the battery can 170. The top cap 175 is electrically connected to the first electrode tab 162 of the electrode assembly 160, and electrically insulated from the battery can 170. Accordingly, the top cap 175 may act as the positive electrode 175 of the battery cell 150.

The top cap 175 is seated on the beading portion 171 of the battery can 170 and is fixed by the crimping portion 172. The sealing gasket 180 may be interposed between the top cap 175 and the crimping portion 172 of the battery can 170 to ensure sealability of the battery can 170 and electrical insulation between the battery can 170 and the top cap 175.

The top cap 175 may have a protruding part that protrudes upwards from the center. The protruding part may guide the contact with an electrical connection component, for example, busbars.

The current collector plate 185 is coupled on the electrode assembly 160. The current collector plate 185 is made of a metal having conductive properties, and is connected to the first electrode tab 162. A lead 187 may be connected to the current collector plate 185, and the lead 187 may be extended upwards from the electrode assembly 160 and directly coupled to the top cap 175 or coupled to the connection plate 195 coupled to the lower surface of the top cap 175.

The current collector plate 185 is coupled to the end of the first electrode tab 162. The coupling between the first electrode tab 162 and the current collector plate 185 may be accomplished, for example, by laser welding. The laser welding may be performed by partially melting the base material of the current collector plate 185, and may be performed with solders for welding interposed between the current collector plate 185 and the first electrode tab 162. In this case, the solders may have a lower melting point than the current collector plate 185 and the first electrode tab 162.

The current collector plate 185 may be coupled to the lower surface of the electrode assembly 160. In this case, a surface of the current collector plate 185 may be coupled to the second electrode tab 164 of the electrode assembly 160 by welding, and the opposite surface may be coupled to the inner bottom surface of the battery can 170 by welding. The coupling structure of the current collector plate 185 coupled to the lower surface of the electrode assembly 160 and the second electrode tab 164 is substantially the same as the current collector plate 185 coupled to the upper surface of the electrode assembly 160 described above.

The insulation plate 190 is positioned between the upper end of the electrode assembly 160 and the beading portion 171 or between the current collector plate 185 coupled on the electrode assembly 160 and the beading portion 171 to prevent the contact between the first electrode tab 162 and the battery can 170 or the contact between the current collector plate 185 and the battery can 170.

The insulation plate 190 has a lead hole 193 through which the lead 187 extending upwards from the current collector plate 185 or the first electrode tab 162 may come out. The lead 187 extending upwards through the lead hole 193 is coupled to the lower surface of the connection plate 195 or the lower surface of the top cap 175.

As described above, the battery cell 150 according to an embodiment of the present disclosure has a structure in which the top cap 175 provided on the upper side in the lengthwise direction (parallel to the Z axis in FIG. 2) of the battery can 170 and the top edge 173 of the battery can 170 are used as the positive electrode 175 and the negative electrode 170, respectively. Accordingly, in electrically connecting the plurality of battery cells 150 according to an embodiment of the present disclosure, the electrical connection component such as the busbar assembly 200 may be positioned on only one side of the battery cells 150, thereby achieving the simplified structure and improved energy density.

Figure 4:
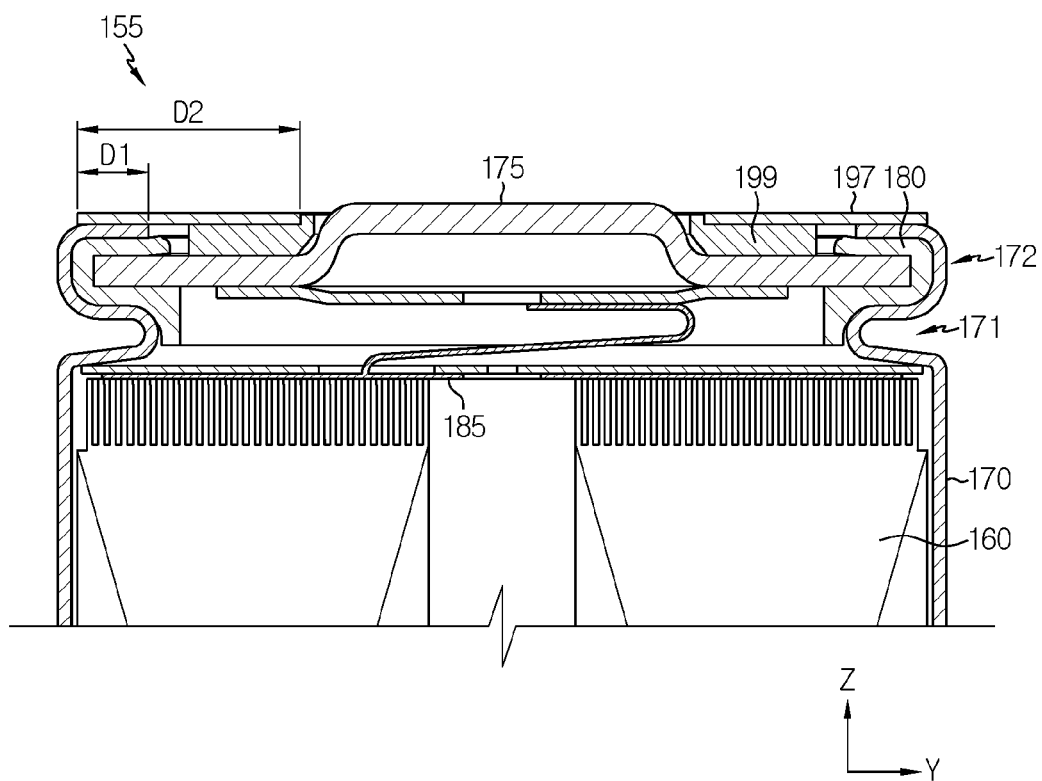
FIG. 4 is a diagram illustrating a battery cell according to another embodiment of the battery cell assembly of FIG. 3.

FIG. 4 is a diagram illustrating a battery cell according to another embodiment of the battery cell assembly of FIG. 3.

Since the battery cell 155 according to this embodiment is similar to the battery cell 150 of the previous embodiment, the substantially identical or similar elements to the previous embodiment is omitted to avoid redundancy, and hereinafter, description will be made based on difference(s) between this embodiment and the previous embodiment.

Referring to FIG. 4, in addition to the components of the battery cell 150 described previously, the battery cell 155 may further include a metal washer 197 and an insulation washer 199.

The metal washer 197 is a component that is made of a metal having conductive properties and is approximately in the shape of a disc having a hole at the center. The metal washer 197 is coupled on the crimping portion 172 of the battery can 170. The coupling between the metal washer 197 and the crimping portion 172 may be accomplished, for example, by laser welding.

The metal washer 197 is electrically insulated from the top cap 175. The top cap 175 is exposed through the hole formed at the center of the metal washer 197, and the metal washer 197 is spaced apart from the protruding part formed at the center of the top cap 175. Additionally, the metal washer 197 is vertically spaced apart from the remaining part except the protruding part of the top cap 175. Accordingly, the metal washer 197 is electrically connected to the second electrode tab 164 and the battery can 170 and may act as the negative electrode of the battery cell 155.

A width D2 of the metal washer 197 is larger than a width D1 of the upper surface of the crimping portion 172 of the battery can 170. This is to increase the coupling area between the electrical connection component such as the busbar assembly 200 and the metal washer 197 in coupling the electrical connection component to the metal washer 197 to connect the plurality of battery cells 150. As described above, with the increasing coupling area between the electrical connection component and the metal washer 197, it is possible to smoothly perform the welding process, improve the bonding strength between the two components and reduce the electrical resistance at the coupled part.

The insulation washer 199 is interposed between the top cap 175 and the metal washer 197. The insulation washer 199 is made of a material having insulating properties. In the battery cell 155 according to an embodiment of the present disclosure, since the top cap 175 acts as the positive electrode and the metal washer 197 acts as the negative electrode, the top cap 175 and the metal washer 197 need to maintain the electrical insulation condition. Accordingly, the insulation washer 199 may be preferably applied to stably maintain the insulation condition.

The insulation washer 199 is interposed between the lower surface of the metal washer 197 and the top cap 175. As described above, the metal washer 197 has a larger width D2 than the width D1 of the upper surface of the crimping portion 172, and is extended from the crimping portion 172 to the protruding part at the center of the top cap 175. Accordingly, the insulation washer 199 may be extended to cover the inner surface of the hole formed at the center of the metal washer 197 to prevent the contact between the inner surface of the hole formed at the center of the metal washer 197 and the protruding part of the top cap 175.

When the insulation washer 199 is made of resin, the insulation washer 199 may be coupled to the metal washer 197 and the top cap 175 by heat fusion. In this case, it is possible to enhance sealability at the coupling interface between the insulation washer 199 and the metal washer 197 and the coupling interface between the insulation washer 199 and the top cap 175.

Hereinafter, the busbar assembly 200 for electrical connection to the plurality of battery cells 150 will be described in more detail.

Figure 5:
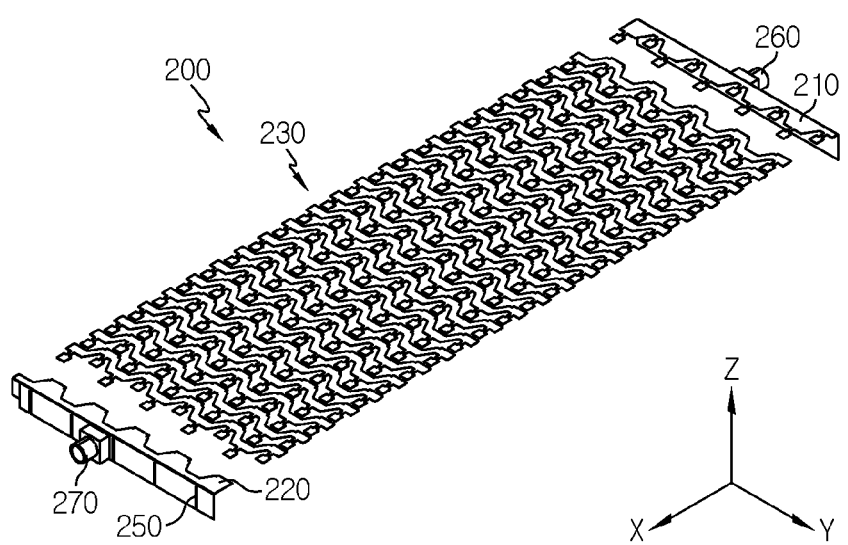
FIG. 5 is a perspective view of a busbar assembly of the battery pack of FIG. 2.
Figure 6:
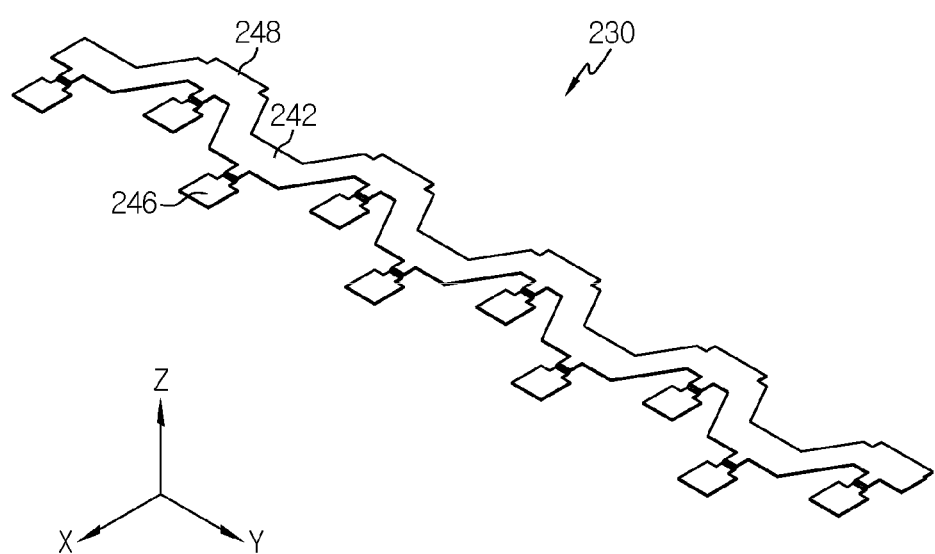
FIG. 6 is a perspective view of a connection busbar of the busbar assembly of FIG. 5.

FIG. 5 is a perspective view of the busbar assembly of the battery pack of FIG. 2, and FIG. 6 is a perspective view of the connection busbar of the busbar assembly of FIG. 5.

Referring to FIGS. 5 and 6, the busbar assembly 200 may be on the battery cell assembly 100 (+Z axis direction) and electrically connected to the plurality of battery cells 150. The electrical connection of the busbar assembly 200 may be a parallel and/or series connection.

The busbar assembly 200 may be electrically connected to the positive electrode 175 (see FIG. 3) and the negative electrode 170 (see FIG. 3) of the plurality of battery cells 150 (see FIG. 2), and electrically connected to an external charge/discharge line through connectors 260, 270.

Hereinafter, the components of the busbar assembly 200 will be described in more detail.

The busbar assembly 200 may include a pair of main busbars 210, 220, a connection busbar 230, a cooling unit insertion slot 250 and the pair of connectors 260, 270.

The pair of main busbars 210, 220 may be electrically connected to the battery cell assembly 100, and may include the connectors 260, 270 connected to the external charge/discharge line.

The pair of main busbars 210, 220 may be electrically connected to the battery cells 150 positioned at two outermost sides (X axis direction) among the battery cells 150 of the battery cell assembly 100. Specifically, each of the pair of main busbars 210, 220 may be electrically connected to each of the battery cells 150 positioned on the outermost sides, in the lengthwise direction (X axis direction) of the battery cell assembly 100.

The pair of main busbars 210, 220 may include the main positive electrode busbar 210 and the main negative electrode busbar 220.

The main positive electrode busbar 210 may be positioned at one side (−X axis direction) of the busbar assembly 200 on the battery cell assembly 100 (+Z axis direction). The main positive electrode busbar 210 may be electrically connected to the positive electrode 175 of the battery cells 150 positioned on one outermost side (−X axis direction) of the battery cell assembly 100. The electrical connection may be established through a welding process for electrical connection such as laser welding or ultrasonic welding.

The main positive electrode busbar 210 may include the positive connector 260 as described below for connection to the charge/discharge line. The positive connector 260 may be provided on one side (−X axis direction) of the main positive electrode busbar 210 in a protruding manner.

The main negative electrode busbar 220 may be at the other side (+X axis direction) of the busbar assembly 200 on the battery cell assembly 100 (+Z axis direction).

The main negative electrode busbar 220 may be electrically connected to the negative electrode 170 of the battery cells 150 positioned on the other outermost side (+X axis direction) of the battery cell assembly 100. The electrical connection may be established through a welding process for electrical connection such as laser welding or ultrasonic welding.

The main negative electrode busbar 220 may include the negative connector 270 as described below for connection to the charge/discharge line. The negative connector 270 may be provided on the other side (+X axis direction) of the main negative electrode busbar 220 in a protruding manner.

The connection busbar 230 is used to electrically connect the plurality of battery cells 150, and a plurality of connection busbars 230 may be provided. The plurality of connection busbars 230 may be electrically connected to the pair of main busbars 210, 220, and connected to the positive electrode 175 and the negative electrode 170 of the plurality of battery cells 150.

The plurality of connection busbars 230 may be spaced a predetermined distance apart from each other along the lengthwise direction (X axis direction) of the battery cell assembly 100. Furthermore, the plurality of connection busbars 230 may be between the main positive electrode busbar 210 and the main negative electrode busbar 220 in the lengthwise direction (X axis direction) of the busbar assembly 200.

Each of the plurality of connection busbars 230 may include a layer body 242 and electrode connection portions 246, 248.

The layer body 242 may be formed with a predetermined length along the widthwise direction (Y axis direction) of the battery cell assembly 100. The layer body 242 may be provided in a shape corresponding to the arrangement structure of the battery cells 150 in the widthwise direction (Y axis direction) of the battery cell assembly 100 for electrical connection to the battery cells 150.

The layer body 242 may be made of a conductive material. For example, the layer body 242 may be made of a metal, for example, aluminum or copper. The layer body 242 is not limited thereto and may be made of any other material for the electrical connection.

A support layer may be on the bottom of the layer body 242 to support the busbar layer 240. The support layer may be on the bottom (−Z axis direction) of the layer body 242 to support the layer body 242. The support layer may have a shape corresponding to the layer body 242, and may be fixed in contact with the bottom (−Z axis direction) of the layer body 242.

The support layer may be made of an insulating material to prevent an electrical short between the plurality of battery cells 150 and the layer body 242. For example, the support layer may include a polyimide film. The support layer is not limited thereto, and may include any other insulation member made of an insulating material.

The electrode connection portions 246, 248 may protrude from the layer body 242 and may be connected to the positive electrode 175 and the negative electrode 170 of the battery cells 150. Specifically, the electrode connection portions 246, 248 may include the positive electrode connection portion 246 and the negative electrode connection portion 248.

A plurality of positive electrode connection portions 246 may be provided, and may protrude to a predetermined size on one side (+X axis direction) of the layer body 242 and may be spaced a predetermined distance apart from each other along the lengthwise direction (Y axis direction) of the layer body 242.

The plurality of positive electrode connection portions 246 may be electrically connected to the positive electrode 175 of the battery cells 150 of the battery cell assembly 100 below the busbar assembly 200 (−Z axis direction). The electrical connection may be established through a welding process for electrical connection such as laser welding or ultrasonic welding.

A plurality of negative electrode connection portions 248 may be provided, and may protrude to a predetermined size on the other side (−X axis direction) of the layer body 242 and may be spaced a predetermined distance apart from each other along the lengthwise direction (Y axis direction) of the layer body 242.

The plurality of negative electrode connection portions 248 may be electrically connected to the negative electrode 170 of the battery cells 150 of the battery cell assembly 100 below the busbar assembly 200 (−Z axis direction). The electrical connection may be established through a welding process for electrical connection such as laser welding or ultrasonic welding.

The cooling unit insertion slot 250 may be provided in the main busbar 220, and allow one end 370 of the cooling unit 300 as described below to pass therethrough. Specifically, a plurality of cooling unit insertion slots 250 may be provided in the main negative electrode busbar 220, and allow a cooling water inlet/outlet 370 of the cooling unit 300 as described below to pass therethrough. The cooling water inlet/outlet 370 as described below may pass through the cooling unit insertion slot 250 and may be exposed beyond the front side (+X axis direction) of the main busbar 220 in the same way as the connector 270 as described below.

The pair of connectors 260, 270 is used for connection to the external charge/discharge line, and may include the positive connector 260 and the negative connector 270. The positive connector 260 may be provided on one side (−X axis direction) of the main positive electrode busbar 210 in a protruding manner, and the negative connector 270 may be provided on the other side (+X axis direction) of the main negative electrode busbar 220 in a protruding manner.

Referring back to FIG. 2, the cooling unit 300 is used to cool the battery cell assembly 100, and may be positioned below the busbar assembly 200 (−Z axis direction) between the plurality of battery cells 150 along the lengthwise direction (X axis direction) of the battery cell assembly 100.

A plurality of cooling units 300 may be provided.

The plurality of cooling units 300 may be arranged facing the plurality of battery cells 150 in the widthwise direction (Y axis direction) of the plurality of battery cell assemblies 100. Here, the plurality of cooling units 300 may be positioned in contact with the facing battery cells 150 to increase the cooling performance.

Hereinafter, the cooling unit 300 will be described in more detail.

Figure 7:
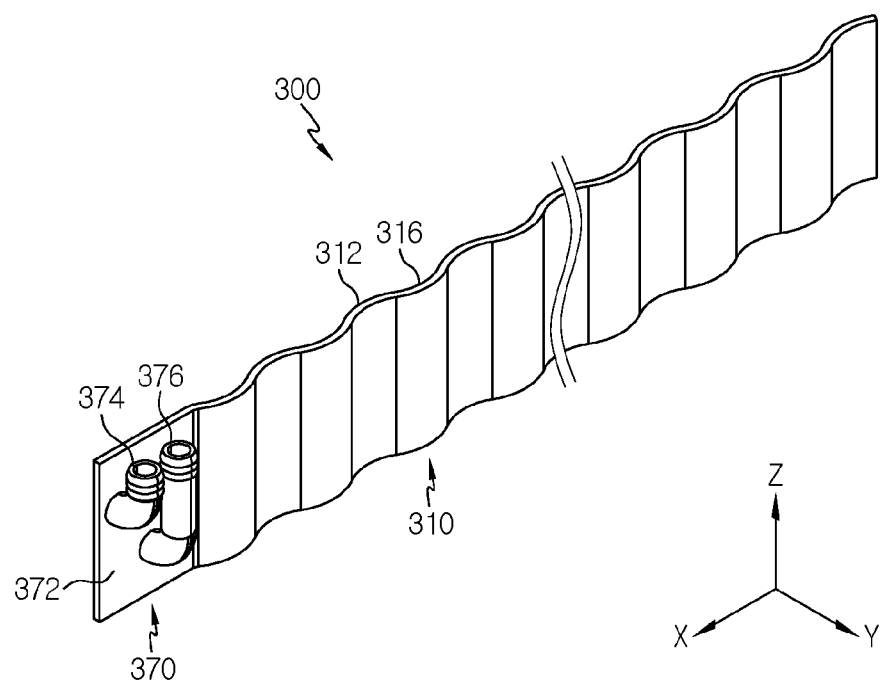
FIG. 7 is a perspective view of a cooling unit of the battery pack of FIG. 2.
Figure 8:
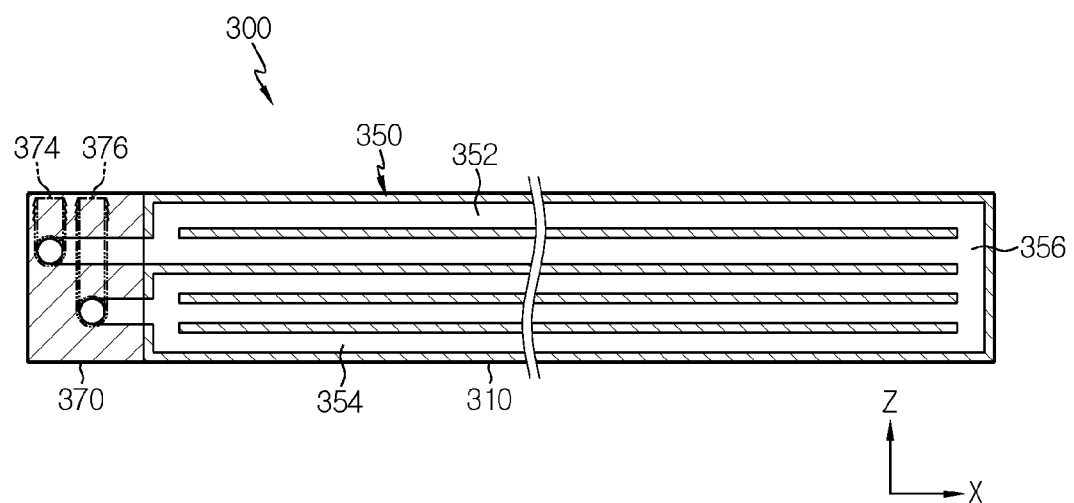
FIG. 8 is a cross-sectional view of the cooling unit of FIG. 7.

FIG. 7 is a perspective view of the cooling unit of the battery pack of FIG. 2, and FIG. 8 is a cross-sectional view of the cooling unit of FIG. 7.

Referring to FIGS. 7 and 8 together with FIG. 2, the cooling unit 300 may include a cooling tube 310, a cooling channel 350 and the cooling water inlet/outlet 370.

The cooling tube 310 may be formed with a predetermined size along the lengthwise direction (X axis direction) of the battery cell assembly 100, and may be between the plurality of battery cells 150 and include the cooling channel 350 in which cooling water as described below circulates.

The cooling tube 310 may be formed in a shape corresponding to the outer surface the plurality of facing battery cells 150 in the widthwise direction (Y axis direction) of the battery cell assembly 100.

The cooling tube 310 may have a plurality of convex portions 312 and a plurality of concave portions 316 in an alternating manner along the lengthwise direction (X axis direction) of the battery cell assembly, the convex portions 312 and the concave portions 316 having convex and concave shapes in the widthwise direction (Y axis direction) of the battery cell assembly 100, respectively.

The cooling tube 310 may be positioned in contact with the outer surface of the plurality of battery cells 150 to further increase the cooling performance of the battery cell assembly 100. The cooling tube 310 may be adhered and fixed to the plurality of battery cells 150 through a filling member 500 as described below or a separate adhesive member.

The cooling channel 350 may allow the cooling water for cooling the battery cell assembly 100 to circulate, and may be in the cooling tube 310 and connected in communication with the cooling water inlet/outlet 370 as described below.

The cooling channel 350 may include an upper channel 352, a lower channel 354 and a connection channel 356.

The upper channel 352 may be on the cooling tube 310 near the busbar assembly 200, and may be formed with a predetermined length along the lengthwise direction (X axis direction) of the cooling tube 310. The upper channel 352 may be connected in communication with a cooling water feed port 374 of the cooling water inlet/outlet 370.

At least one upper channel 352 may be provided. Hereinafter, this embodiment is described based on a plurality of upper channels 352 provided to ensure the cooling performance.

The lower channel 354 may be below the cooling tube 310 (−Z axis direction) spaced apart from the at least one upper channel 352, and may be formed with a predetermined length along the lengthwise direction (X axis direction) of the cooling tube 310. The lower channel 354 may be connected in communication with a cooling water outlet port 376 of the cooling water inlet/outlet 370.

At least one lower channel 354 may be provided. Hereinafter, this embodiment is described based on a plurality of lower channels 354 provided to ensure the cooling performance.

The connection channel 356 may connect the at least one upper channel, in this embodiment, the plurality of upper channels 352 to the at least one lower channel, in this embodiment, the plurality of lower channels 354.

The connection channel 356 may be at the other end of the cooling tube 310 (+X axis direction) opposite the cooling water inlet/outlet 370 to maximize the cooling channel 350.

In this embodiment, during the circulation of the cooling water in the cooling channel 350, the cooling water fed from the cooling water feed port 374 may be fed to the upper channel 352 close to the busbar assembly 200 and move to the cooling water outlet port 376 through the connection channel 356 and the lower channel 354.

Accordingly, in this embodiment, cold cooling water may be fed to an area close to the busbar assembly 200 having a higher temperature distribution in the battery pack 10, thereby significantly improving the cooling performance of the battery cell assembly 100.

The cooling water inlet/outlet 370 may be connected to the cooling tube 310 such that it communicates with the cooling channel 350 of the cooling tube 310. The cooling water inlet/outlet 370 may be connected in communication with an external cooling line through the cooling unit insertion slot 250.

The cooling water inlet/outlet 370 may be on one side (+X axis direction) along the lengthwise direction (X axis direction) of the battery cell assembly 100. The cooling tube 310 connected to the cooling water inlet/outlet 370 may be formed with a predetermined length from the cooling water inlet/outlet 370 toward the other side of the battery cell assembly 100 (−X axis direction) in the lengthwise direction (X axis direction) of the battery cell assembly 100.

The cooling water inlet/outlet 370 may include an inlet/outlet body 372, the cooling water feed port 374 and the cooling water outlet port 376.

The inlet/outlet body 372 may be connected to one end (+X axis direction) of the cooling tube 310. A connection pipe 390 as described below may be on the inlet/outlet body 372 (+Z axis direction).

The cooling water feed port 374 may be in the inlet/outlet body 372 and connected in communication with the upper channel 352. The cooling water feed port 374 may be connected in communication with the external cooling line.

The cooling water outlet port 376 may be in the inlet/outlet body 372 and connected in communication with the lower channel 354. The cooling water outlet port 376 may be spaced a predetermined distance apart from the cooling water feed port 374 and connected in communication with the external cooling line.

Referring back to FIG. 2, the cell accommodation unit 400 is used to ensure the strength of the battery cell assembly 100, and may be positioned in a honeycomb shape. The cell accommodation unit 400 may surround the cooling unit 300 and the battery cell assembly 100 in at least part. The cell accommodation unit 400 may partition the plurality of battery cells 150 together with the cooling unit 300.

Figure 9:
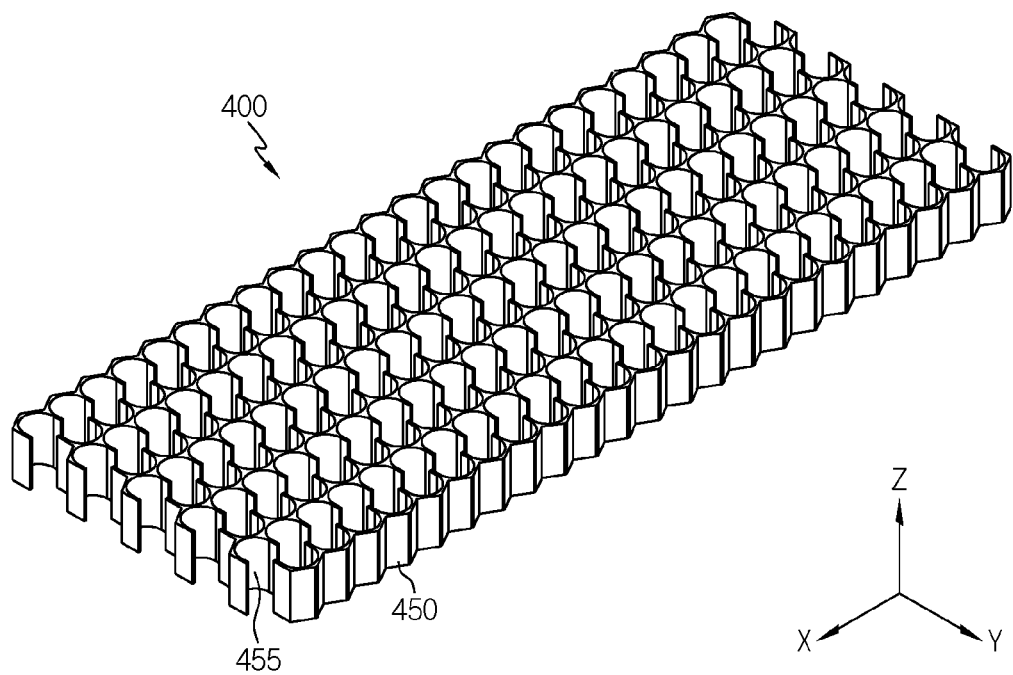
FIG. 9 is a perspective view of a cell accommodation unit of the battery pack of FIG. 2.

FIG. 9 is a perspective view of the cell accommodation unit of the battery pack of FIG. 2.

Referring to FIG. 9 together with FIG. 2, the cell accommodation unit 400 may include a reinforcement structure on two outermost sides to reinforce the strength of the battery cell assembly 100.

The reinforcement structure may have an angled shape structure protruding outward from the cell accommodation unit. For example, the reinforcement structure may have a triangular prism shape or a trapezoidal shape. That is, in this embodiment, the two outermost sides of the cell accommodation unit 400 having the reinforcement structure may be formed with a protruding angled shape structure, not a curve shape. The reinforcement structure may be continuous along the lengthwise direction (X axis direction) of the battery cell assembly 100. In case that the outermost surface is a concave curved surface, the thickness of the cell accommodation unit 400 on the outermost side reduces, failing to ensure the strength, and in case that the outermost surface is a convex curved surface, the thickness of the outermost surface increases, failing to ensure the optimal injection amount of resin on the outermost side. In this embodiment, through the angled shape structure, it is possible to ensure the strength and ensure the optimal injection amount of resin on the outermost side.

The cell accommodation unit 400 may include at least one accommodation member 450 formed with a predetermined length along the lengthwise direction (X axis direction) of the battery cell assembly 100 to cover at least one side of the battery cells 150. The at least one accommodation member 450 may have a shape corresponding to the outer surface of the facing battery cells 150 to accommodate the plurality of facing battery cells 150.

A plurality of accommodation members 450 may be provided, and may be spaced a predetermined distance apart from each other along the widthwise direction (Y axis direction) of the battery cell assembly 100.

The cooling unit 300 may be between the plurality of accommodation members 450. Specifically, the cooling unit 300 may be between the plurality of accommodation members 450 in the widthwise direction (Y axis direction) of the battery cell assembly 100. More specifically, the plurality of cooling tubes 310 (see FIG. 7) of the cooling unit 300 may be between the plurality of accommodation members 450.

The plurality of accommodation members 450 may ensure the strength of the battery cell assembly 100 and the cooling unit 300 and occupy a predetermined space in the battery pack 10 to reduce the injection amount of the filling member 500 as described below. When the filling member 500 comprises the silicone resin as described below, the price is relatively high, but it is possible to reduce the injection amount of the silicone resin through the plurality of accommodation members 450, thereby achieving more price competitiveness in the fabrication of the battery pack 10.

Each accommodation member 450 may include a plurality of cell accommodation portions 455.

The plurality of cell accommodation portions 455 is used to accommodate the facing battery cells 150 in at least part, and when accommodating the battery cells 150 in the accommodation member 450, the corresponding number of cell accommodation portions 455 may be provided at a location corresponding to the facing battery cells 150.

The plurality of cell accommodation portions 455 may have a shape corresponding to the outer surface of the facing battery cells 150 and may be formed with a predetermined depth to accommodate the outer surface of the facing battery cells 150 in at least part. Specifically, the plurality of cell accommodation portions 455 may be concavely formed with the predetermined depth, and have a shape corresponding to the outer surface of the facing battery cells 150.

An adhesive may be applied between the battery cells 150 and the cell accommodation units 455 to increase the fixing strength of the battery cells 150 when accommodating the battery cells 150 through the plurality of cell accommodation portions 455. Meanwhile, here, the adhesive may include an adhesive material or an adhesive tape having a predetermined adhesive strength, and the filling member 500 as described below may be used for the adhesive. That is, the adhesive may include a potting resin.

Meanwhile, the accommodation members 450 between the accommodation members 450 on the outermost side may include the plurality of cell accommodation portions 455 on two sides in the widthwise direction (Y axis direction). Here, the cell accommodation units 455 on the two sides of each accommodation member 450 in the widthwise direction Y may be arranged in a staggered manner along the lengthwise direction (X axis direction) of the accommodation member 450. This is to accommodate the maximum number of cylindrical battery cells 150.

Referring back to FIG. 2, the filling member 500 may be filled in a space between the cooling unit 300 and the plurality of battery cells 150 in the heightwise direction (Z axis direction) of the battery pack 10.

Meanwhile, in FIG. 2, the filling member 500 is indicated by a hexahedron prism shaped dashed line for convenience of understanding, and the filling member 500 may be fully filled in the space between the cooling unit 300 and the plurality of battery cells 150.

The filling member 500 may prevent thermal runaway of the battery cells 150, fix the battery cells 150 more stably, and increase the heat distribution efficiency of the plurality of battery cells 150, thereby further increasing the cooling performance of the battery cells 150.

The filling member 500 may include a potting resin. The potting resin may be formed by injecting a thin resin material into the plurality of battery cells 150 and curing it. Here, the injection of the resin material may be performed at room temperature of about 15° C. to 25° C. to prevent thermal damage of the plurality of battery cells 150.

Specifically, the filling member 500 may include a silicone resin. The filling member 500 is not limited thereto, and may include any resin material other than the silicone resin, capable of fixing the battery cells 150 and improving the heat distribution efficiency.

More specifically, the filling member 500 may cover the non-contact area of the battery cells 150 with the cooling tube 310, and guide the heat balance of the battery cells 150 to prevent the cooling imbalance of the battery cells 150, thereby preventing the local degradation of the battery cells 150. Additionally, it is possible to significantly improve the safety of the battery cells 150 through the local degradation prevention of the battery cells 150.

Additionally, the filling member 500 may act as an insulator to obstruct the flow of electricity to the adjacent battery cells 150 when damage occurs due to an abnormal situation in at least one specific battery cell 150 among the plurality of battery cells 150.

Additionally, the filling member 500 may include a material having high specific heat performance. Accordingly, the filling member 500 may increase the thermal mass to delay a temperature rise of the battery cells 150 during fast charge/discharge of the battery cells 150, thereby preventing a rapid temperature rise of the battery cells 150.

Additionally, the filling member 500 may include glass bubble. The glass bubble may reduce the specific weight of the filling member 500, thereby increasing the energy density compared to the weight.

Additionally, the filling member 500 may include a material having high heat resistance performance. Accordingly, the filling member 500 may effectively prevent thermal runaway to the adjacent battery cells when a thermal event occurs due to overheat in at least one specific battery cell 150 among the plurality of battery cells 150.

Additionally, the filling member 500 may comprise a material having high flame retardant performance. Accordingly, the filling member 500 may minimize a fire risk when a thermal event occurs due to overheat in at least one specific battery cell 150 among the plurality of battery cells 150.

In addition to the battery cells 150, the filling member 500 may be filled in the busbar assembly 200. Specifically, the battery cells 150 may be filled in the busbar assembly 200 to cover the busbar assembly 200 in at least part.

Here, the filling member 500 may be continuously filled in between the busbar assembly 200 and the battery cells 150 without a discontinued or isolated space between the busbar assembly 200 and the battery cells 150 in the vertical direction (Z axis direction) of the battery cell assembly 100.

The filling member 500 may fix the plurality of battery cells 150 and the busbar assembly 200 more stably. Furthermore, the filling member 500 may effectively stop the spread of flames and heat to the adjacent battery cells 150 and the busbar assembly 200 when flames occur at the upper part of the battery cells 150 due to the thermal event.

Since the filling member 500 according to this embodiment is continuously filled in the battery cells 150 and the busbar assembly 200 without discontinuity, it is possible to achieve uniform heat distribution in the area between the battery cells 150 and the busbar assembly 200 without imbalance in heat distribution, thereby significantly increase the cooling performance of the battery pack 10.

Furthermore, the filling member 500 may be filled to fully cover the cell accommodation unit 400 as described below. Here, the filling member 500 may be continuously filled in the battery cells 150, the busbar assembly 200 and the cell accommodation unit 400 without discontinuity. Accordingly, it is possible to improve the cooling performance of the battery pack 10. Furthermore, the filling member 500 may be filled to cover the reinforcement structure of the cell accommodation unit 400.

Additionally, the filling member 500 may be filled to cover the cell support unit 600 as described below in at least part. Here, the filling member 500 may be continuously filled in the battery cells 150, the busbar assembly 200, the cooling unit 300 and the cell accommodation unit 400 without discontinuity. Accordingly, it is possible to further improve the cooling performance of the battery pack 10.

Here, the filling member 500 may be continuously filled in the battery cells 100, the busbar assembly 200, the cooling unit 300, the cell accommodation unit 400 and the cell support unit 600 without discontinuity. Accordingly, it is possible to further improve the cooling performance of the battery pack 10.

Additionally, since the filling member 500 may be filled to cover the battery cells 150, it is possible to effectively prevent thermal runaway that may occur to the adjacent battery cells 100 when a thermal event of the specific battery cell occurs.

Referring back to FIG. 2, the battery pack 10 may further include the cell support unit 600.

The cell support unit 600 may be below the cell accommodation unit 400 to support the battery cell assembly 100 and the cooling unit 300. The cell support unit 600 may support the battery cell assembly 100 together with the cell accommodation unit 400. Specifically, the cell support unit 600 may support the bottom of the battery cells 150, and the cell accommodation unit 400 may support the side of the battery cells 150.

The cell support unit 600 may be positioned perpendicular to the cell accommodation unit 400. Specifically, the cell support unit 600 may be coupled perpendicular to the cell accommodation unit 400, and may ensure the strength of the battery pack 10 together with the cell accommodation unit 400.

Hereinafter, the cell support unit 600 will be described in more detail.

Figure 10:
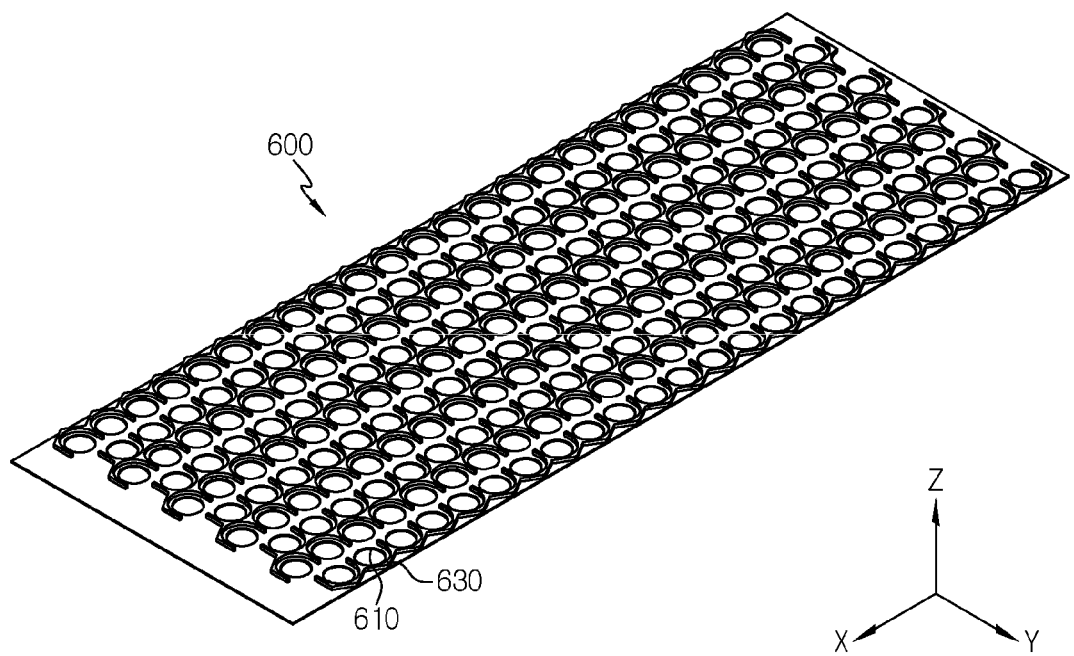
FIG. 10 is a perspective view of a cell support unit of the battery pack of FIG. 2.
Figure 11:
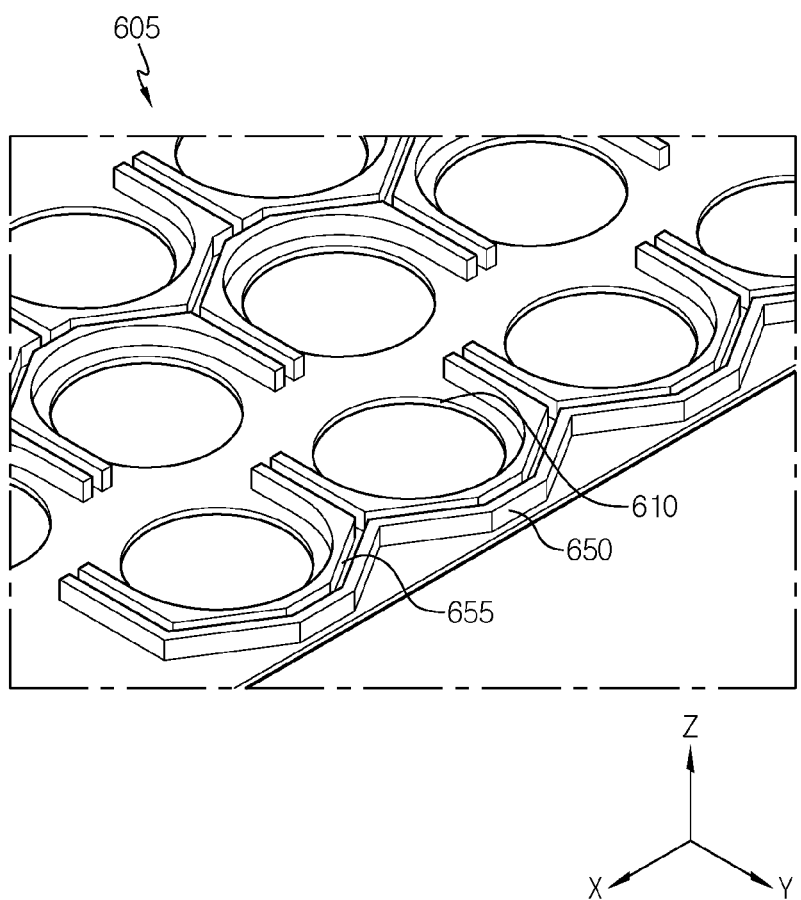
FIG. 11 is a diagram illustrating a support rib according to another embodiment of the cell support unit of FIG. 10.

FIG. 10 is a perspective view of the cell support unit of the battery pack of FIG. 2, and FIG. 11 is a diagram illustrating a support rib according to another embodiment of the cell support unit of FIG. 10.

Referring to FIG. 10, the cell support unit 600 may include a cell mount portion 610 and the support rib 630.

The plurality of battery cells 150 may be seated on the cell mount portion 610, or may be inserted and mounted on the cell mount portion 610.

Specifically, the cell mount portion 610 may be an opening in a predetermined size, and a plurality of cell mount portions 610 corresponding to the plurality of battery cells 150 may be provided. Here, the size of the opening may not exceed the diameter of the battery cell 150. The cell mount portion 610 may guide the support of the battery cell 150 and guide the smoother and faster gas release through the venting portion below the battery cell 150 through the opening.

The support rib 630 may be on the upper surface of the cell support unit 600 and may protrude to a predetermined height to support the bottom of the cell accommodation unit 400. The support rib 630 may be formed with a predetermined length along the lengthwise direction (X axis direction) of the battery cell assembly 100.

A plurality of support ribs 630 may be provided, and the cooling unit 300, especially, the cooling tube 310 of the cooling unit 300 may be between the plurality of support ribs 630. Accordingly, the cooling tube 310 may be seated between the support ribs 630 on the upper surface of the cell support unit 600. Here, the lower surface of the cooling tube 310 may form a step with the support ribs 630. Accordingly, the support rib 630 may effectively prevent the movement of the cooling tube 310 out of the support ribs 630 when a movement such as a sway occurs to the cooling tube 310.

The bottom of the cell accommodation unit 400 may be seated on the plurality of support ribs 630. An adhesive member, for example, a thermal adhesive, may be applied to the upper surface of the plurality of support ribs 630 to support the cell accommodation unit 400 more stably.

Referring to FIG. 11, the plurality of support ribs 650 of the cell support unit 605 may have an insertion groove 655 of a predetermined depth into which the bottom of the cell accommodation unit 400 is inserted.

The insertion groove 655 may have the predetermined depth inside the support ribs 650 protruding upwards (+Z axis direction) from the cell support unit 605 and a size enough for the insertion of the bottom of the cell accommodation unit 400. When the cell accommodation unit 400 is fixed to the cell support unit 605, the cell accommodation unit 400 may be inserted into the insertion groove 655 of the support rib 650 and fixed to the cell support unit 605 more stably.

Figure 12:
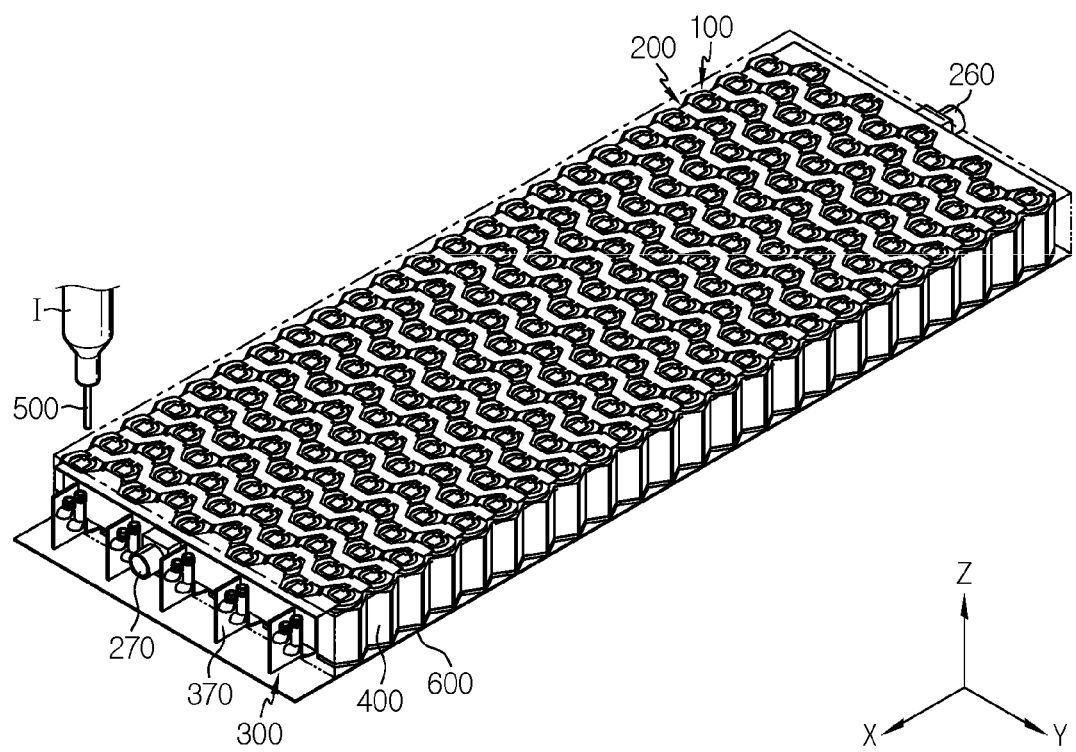
FIG. 12 is a diagram illustrating pack case structure formation through a filling member of the battery pack of FIG. 1.

FIG. 12 is a diagram illustrating pack case structure formation through the filling member of the battery pack of FIG. 1.

Referring to FIG. 12, the manufacturer may form the pack case of the battery pack 10 through the filling member 500 made of the resin material by injecting and applying the filling member 500 through a resin injector I. Here, the filling member 500 may be the silicone resin.

In this instance, to inject and coat the filling member 500 more smoothly, after assembled together, the battery cell assembly 100, the busbar assembly 200, the cooling unit 300, the cell accommodation unit 400 and the cell support unit 600 may be temporarily mounted in a mold (not shown) for guiding the injection of the filling member 500. Here, the mold may have a shape corresponding to the shape of the pack case, and may have a shape for exposing the component that is connected to an external device, such as the positive connector 260, the negative connector 270, the cooling water inlet/outlet 370 and one end of the cell support unit 600.

When the filling member 500 is cured in the mold, the filling member 500 may form the pack case that forms the appearance of the battery pack 10, and subsequently, the manufacturer may remove the mold.

Accordingly, in this embodiment, since the pack case is formed through the filling member 500 made of the potting resin, compared to the conventional pack case formed as a complex assembly of a plurality of plates, it is possible to simplify the assembly process of the battery pack 10 and significantly reduce the fabrication cost, thereby improving the price competitiveness.

Furthermore, compared to the conventional cell frame structure including an assembly of a plurality of plates, in this embodiment, it is possible to reduce the total size of the battery pack 10 through the pack case structure formed by the filling member 500, thereby significantly increasing the energy density.

Figure 13:
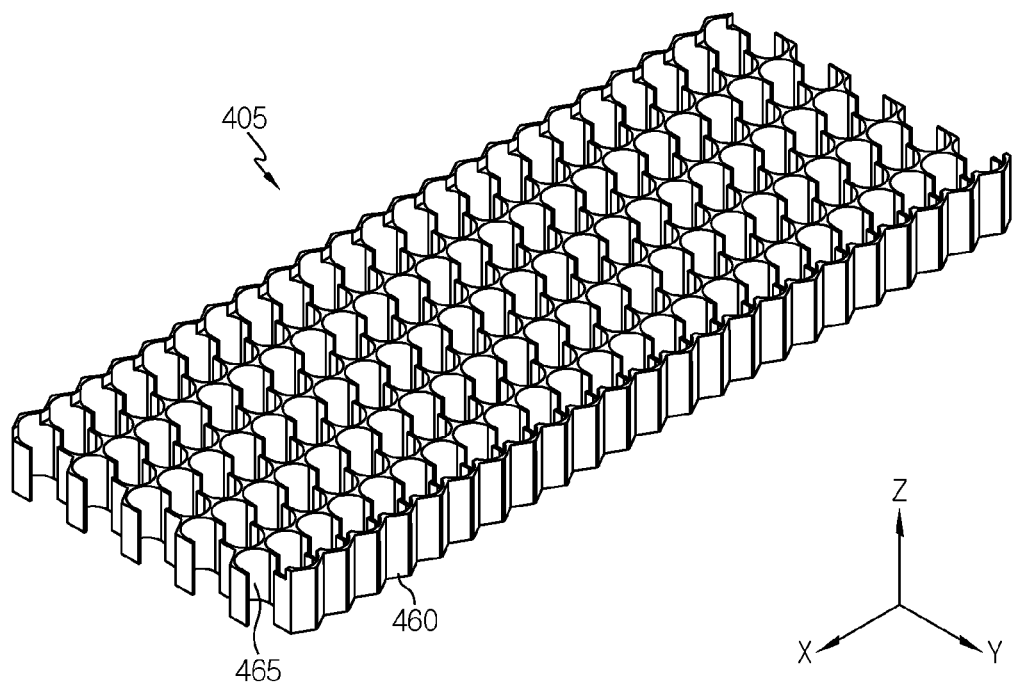
FIG. 13 is a diagram illustrating a cell accommodation unit according to another embodiment of the present disclosure.
Figure 14:
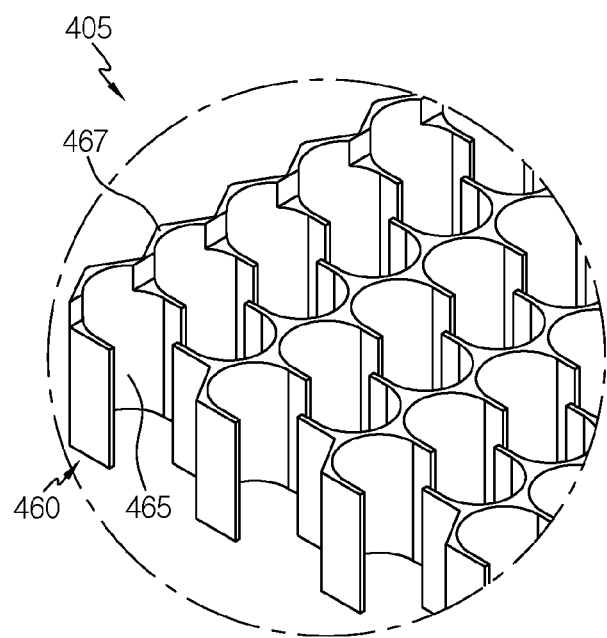
FIG. 14 is an enlarged diagram of the main part of the cell accommodation unit of FIG. 13.

FIG. 13 is a diagram illustrating a cell accommodation unit according to another embodiment of the present disclosure, and FIG. 14 is an enlarged diagram of the main part of the cell accommodation unit of FIG. 13.

Since the cell accommodation unit 405 according to this embodiment is similar to the cell accommodation unit 400 of the previous embodiment, the substantially identical or similar elements to the previous embodiment are omitted to avoid redundancy, and hereinafter, description will be made based on difference(s) between this embodiment and the previous embodiment.

Referring to FIGS. 13 and 14, the cell accommodation unit 405 may include a plurality of accommodation members 460. In the same way as the previous embodiment, the plurality of accommodation members 460 may include a plurality of cell accommodation portions 465. Since the cell accommodation unit 400 has been described above in detail, an overlapping description is omitted in the following description.

The accommodation members 460 on two outermost sides among the plurality of accommodation members 460 may include a guide stop 467.

The guide stop 467 may protrude to a predetermined height at the two upper ends in the lengthwise direction (X axis direction) of the accommodation members 460 arranged on the two outermost sides. When the assembly of the accommodation members 460 is completed, the guide stop 467 may form a predetermined edge in the lengthwise direction (X axis direction) of the cell accommodation unit 405.

The guide stop 467 may increase the injection accuracy of the filling member 500 when injecting the filling member 500 as described below, thereby improving the injection process efficiency.

Figure 15:
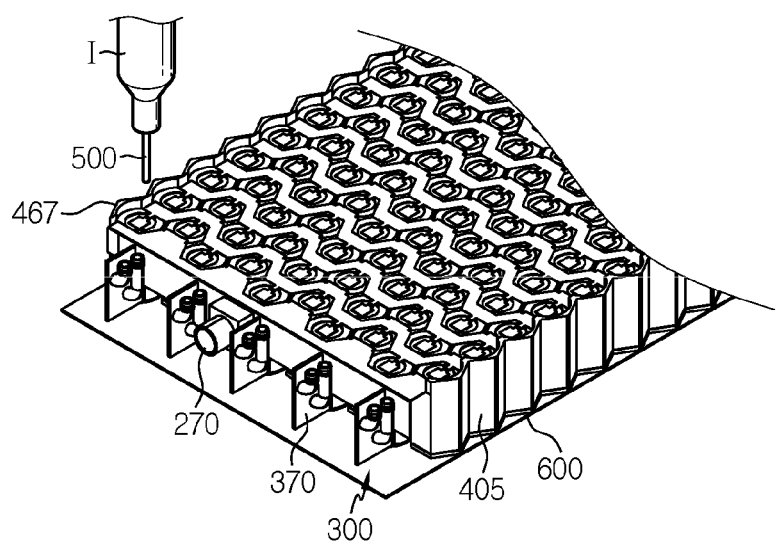
FIG. 15 is a diagram illustrating pack case structure formation through a filling member of a battery pack including the cell accommodation unit of FIG. 13.

FIG. 15 is a diagram illustrating pack case structure formation through the filling member of the battery pack including the cell accommodation unit of FIG. 13.

Referring to FIG. 15, when the operator injects and applies the filling member 500 of the silicone resin through the mold and the resin injector I, the guide stop 467 may increase the injection accuracy of the filling member 500.

Specifically, the guide stop 467 may be provided with a predetermined height at the upper surface edge of the cell accommodation unit 405 in the lengthwise direction of the cell accommodation unit 405 and have a larger height than the upper surface of the busbar assembly 200. The operator may inject the filling member 500 by a height difference between the guide stop 467 and the busbar assembly 200 in the vertical direction (Z axis direction) of the cell accommodation unit 405. When there is no guide stop 467, the operator may have difficulty in determining the optimal injection amount of the filling member 500 for covering the busbar assembly 200 when injecting.

In this embodiment, when injecting the filling member 500 for covering the busbar assembly 200, the filling member 500 may be injected by the predetermined height guided through the guide stop 467, thereby significantly increasing the injection accuracy and injection efficiency by the operator. Additionally, the operator may determine when to stop injecting the filling member 500 through the guide stop 467 more easily.

Accordingly, the operator may increase the injection accuracy and reduce the process time in the injection process of the filling member 500. Additionally, it is possible to ensure the optimal injection amount of the filling member 500, thereby reducing the manufacturing cost of the battery pack 10 and significantly increase the price competitiveness.

Figure 16:
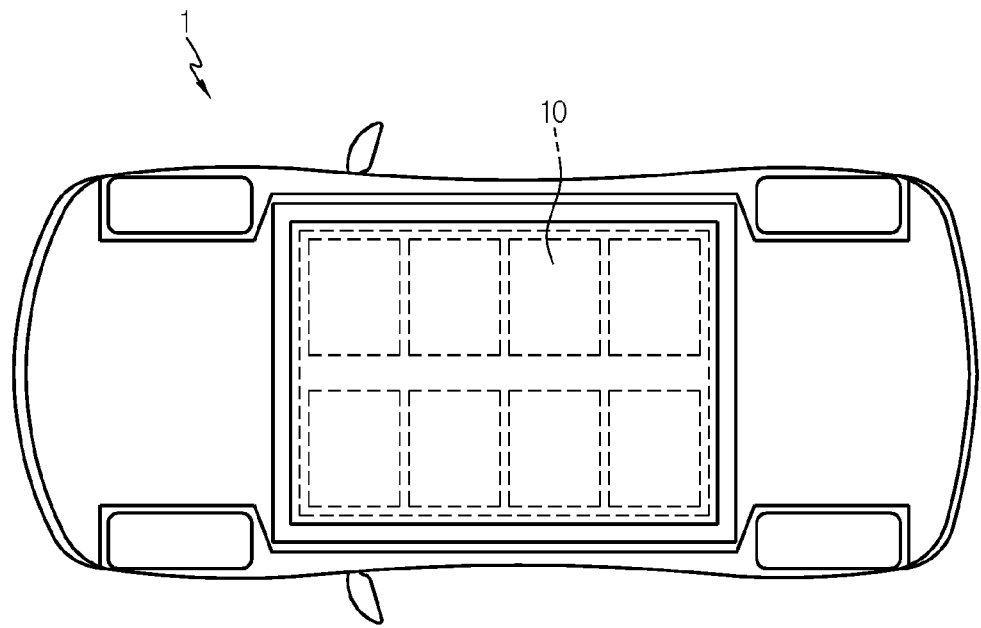
FIG. 16 is a diagram illustrating a vehicle according to an embodiment of the present disclosure.

FIG. 16 is a diagram illustrating a vehicle according to an embodiment of the present disclosure.

Referring to FIG. 16, the vehicle 1 may be an electric vehicle or a hybrid electric vehicle, and may include at least one battery pack 10 of the previous embodiment as an energy source.

In this embodiment, since the above-described battery pack 10 is provided with a compact structure having high energy density, it is easy to achieve a modularized structure of a plurality of battery packs 10 when mounted in the vehicle 1, and it is possible to ensure a relatively high degree of freedom in mounting in various inner space shapes of the vehicle 1.

According to the various embodiments as described above, it is possible to provide the battery pack 10 with increased energy density and strength and the vehicle 1 comprising the same.

Additionally, according to the various embodiments as described above, it is possible to provide the battery pack 10 with improved price competitiveness and fabrication efficiency and the vehicle 1 comprising the same.

Furthermore, according to the various embodiments as described above, it is possible to provide the battery pack 10 with improved cooling performance and the vehicle 1 comprising the same.

While the exemplary embodiment of the present disclosure has been hereinabove shown and described, the present disclosure is not limited to the above-described particular embodiment, and it is obvious to those skilled in the art that a variety of modifications may be made thereto without departing from the essence of the present disclosure claimed in the appended claims, and such modifications should not be individually understood from the technical aspect or scope of the present disclosure.

What is claimed is:

1. A battery pack, comprising:
   a battery cell assembly including a plurality of battery cells;
   a busbar assembly disposed at one side of the battery cell assembly;
   a cooling unit disposed between the plurality of battery cells;
   a cell accommodation unit partitioning the plurality of battery cells together with the cooling unit; and
   a filling member filled in a space between the cooling unit and the plurality of battery cells and in a space between the cell accommodation unit and the cooling unit,
   wherein the filling member is further filled in the busbar assembly to at least partially cover the busbar assembly, and
   wherein the filling member continuously covers the plurality of battery cells, the busbar assembly, the cooling unit and the cell accommodation unit without discontinuity.

2. The battery pack according to claim 1, wherein the filling member is filled to cover the battery cell assembly and the cell accommodation unit.

3. The battery pack according to claim 1, wherein the filling member is continuously filled in between the busbar assembly and the plurality of battery cells in a vertical direction of the battery cell assembly.

4. The battery pack according to claim 1, wherein the filling member comprises a potting resin.

5. The battery pack according to claim 1, wherein the cell accommodation unit includes at least one receiving member formed to have a predetermined length in a longitudinal direction of the battery cell assembly and configured to cover at least one side surface of the battery cell.

6. The battery pack according to claim 5, wherein the at least one receiving member has a shape corresponding to outer surfaces of the plurality of battery cells facing each other.

7. The battery pack according to claim 5, wherein the at least one receiving member is provided in plurality, and the plurality of receiving members are disposed to be spaced apart from each other by a predetermined distance in a width direction of the battery cell assembly.

8. The battery pack according to claim 7, wherein each of the plurality of receiving members includes a plurality of cell receiving parts for receiving the battery cells facing each other.

9. The battery pack according to claim 8, wherein the plurality of cell receiving parts are formed in a concave shape to a predetermined depth.

10. The battery pack according to claim 8, wherein the plurality of cell receiving parts have shapes corresponding to outer surfaces of the battery cells facing each other.

11. The battery pack according to claim 8, wherein an adhesive is provided between the battery cell and the cell receiving part.

12. The battery pack according to claim 11, wherein the adhesive comprises a potting resin.

13. The battery pack according to claim 7, wherein the cooling unit is disposed between the plurality of receiving members in a width direction of the battery cell assembly.

14. The battery pack according to claim 13, further comprising:
   a plurality of cooling tubes formed to have a predetermined length in a longitudinal direction of the battery cell assembly, disposed between the plurality of battery cells, and provided with a cooling channel for circulating cooling water therein; and
   a cooling water inflow/outflow part connected to the plurality of cooling tubes to communicate with the cooling channels of the plurality of cooling tubes.

15. The battery pack according to claim 14, wherein the plurality of cooling tubes are disposed between the plurality of receiving members.

16. The battery pack according to claim 14, wherein the cooling channel comprises:
   an upper channel provided near the busbar assembly;
   a lower channel spaced apart from the upper channel; and
   a connection channel connecting the upper channel and the lower channel.

17. The battery pack according to claim 16, wherein the connection channel is provided at an opposite side of the cooling water inflow/outflow part.

18. The battery pack according to claim 16, wherein the cooling water inflow/outflow part comprises:
   a cooling water feed port connected to the upper flow path; and
   a cooling water outlet port connected to the lower flow path.

19. The battery pack according to claim 16, wherein the upper flow path and the lower flow patch are provided in plurality.

20. The battery pack according to claim 1, further comprising:
   a cell support part coupled to the cell accommodation unit to support the battery cell assembly and the cooling unit.

21. The battery pack according to claim 20, wherein the cell support part is provided with a support rib protruding to a predetermined height to support the cell accommodation unit.

22. The battery pack according to claim 21, wherein a plurality of support ribs are provided, and he cooling unit is between the plurality of the support ribs.

23. The battery pack according to claim 21, wherein the support rib is provided with an insertion groove having a predetermined depth into which a bottom of the cell accommodation unit is inserted.

24. The battery pack according to claim 20, wherein the filling member further continuously covers the cell support part without discontinuity.

25. The battery pack according to claim 20, wherein the cell support is disposed perpendicular to the cell accommodation unit.

26. The battery pack according to claim 20, wherein the cell accommodation unit supports a side portion of the battery cell, and the cell support supports a bottom portion of the battery cell.

27. The battery pack according to claim 20, wherein the cell support part comprises a cell seating part on which the battery cell is seated.

28. The battery pack according to claim 27, wherein the cell seating part is formed as an opening having a predetermined size.

29. The battery pack according to claim 28, wherein the opening has a size not exceeding a diameter the battery cell.

30. The battery pack according to claim 1, wherein the cell accommodation unit is arranged in a honeycomb shape.

31. The battery pack according to claim 1, wherein the busbar assembly is disposed at an upper side of the battery cell assembly.

32. The battery pack according to claim 1, wherein the cell accommodation unit is provided at both outermost sides thereof with a reinforcement structure for reinforcing rigidity of the battery cell assembly.

33. The battery pack according to claim 32, wherein the reinforcement structure is provided as a prismatic concavo-convex structure protruding outward from the cell accommodation unit.

34. The battery pack according to claim 32, wherein the reinforcement structure is continuously formed along a longitudinal direction of the battery cell assembly.

35. The battery pack according to claim 32, wherein the reinforcement structure has a triangle prism shape or a trapezoidal prism shape.

36. The battery pack according to claim 32, wherein the filling member is filled to cover the reinforcement structure.

37. The battery pack according to claim 1, wherein the cell accommodation unit includes at least one receiving member formed to have a predetermined length in a longitudinal direction of the battery cell assembly and covering at least one side surface of the battery cell, and
the battery pack further comprises a guide step protruding from an upper portion of the cell accommodation unit to a predetermined height, wherein the predetermined height of the guide step is higher than an upper surface of the bus bar assembly, and the filling member is filled to a height guided through the guide step.

38. The battery pack according to claim 1, wherein the filling member is further filled in a space between the cell accommodation unit and the plurality of battery cells.

39. A vehicle comprising at least one battery pack according to claim 1.

* * * * *